United States Patent [19]

Hildebrandt

[11] 4,072,815

[45] Feb. 7, 1978

[54] CABLE CONNECTION FOR LOW-TEMPERATURE CABLE

[75] Inventor: Ullrich Hildebrandt, Munich, Germany

[73] Assignee: Linde Aktiengesellschaft, Wiesbaden, Germany

[21] Appl. No.: 712,321

[22] Filed: Aug. 6, 1976

[30] Foreign Application Priority Data

Aug. 8, 1975 Germany .............................. 2535487

[51] Int. Cl.² .......................................... H01B 12/00
[52] U.S. Cl. .................................. 174/15 S; 174/21 C
[58] Field of Search .............. 174/15 S, 15 R, 15 CA, 174/21 R, 22 R, 22 C

[56] References Cited

U.S. PATENT DOCUMENTS

| 3,522,361 | 7/1970 | Kafka | 174/15 S |
|---|---|---|---|
| 3,725,565 | 4/1973 | Schmidt | 174/15 S X |
| 3,728,463 | 4/1973 | Kullmann et al. | 174/15 S X |
| 3,764,726 | 10/1973 | Kohler | 174/15 CA X |
| 3,885,636 | 5/1975 | Hildebrandt | 174/15 S |
| 3,902,000 | 8/1975 | Forsyth et al. | 174/15 CA X |

*Primary Examiner*—Arthur T. Grimley
*Attorney, Agent, or Firm*—Karl F. Ross

[57] ABSTRACT

The cable connection for low-temperature cable in which a pair of cable ends are joined. Each cable comprises a plurality of generally coaxial ducts defining a central compartment traversed by the electrical conductor or a plurality of electrical conductors in a sheath of electrical insulation and a pair of evacuated (vacuum) compartments surrounding the central compartment. Between the two vacuum compartments there is provided a coolant-filled compartment. In the connector, the evacuated compartments of the two cable ends overlap axially and the connection is formed by rigid, preferably cylindrical, walls.

10 Claims, 3 Drawing Figures

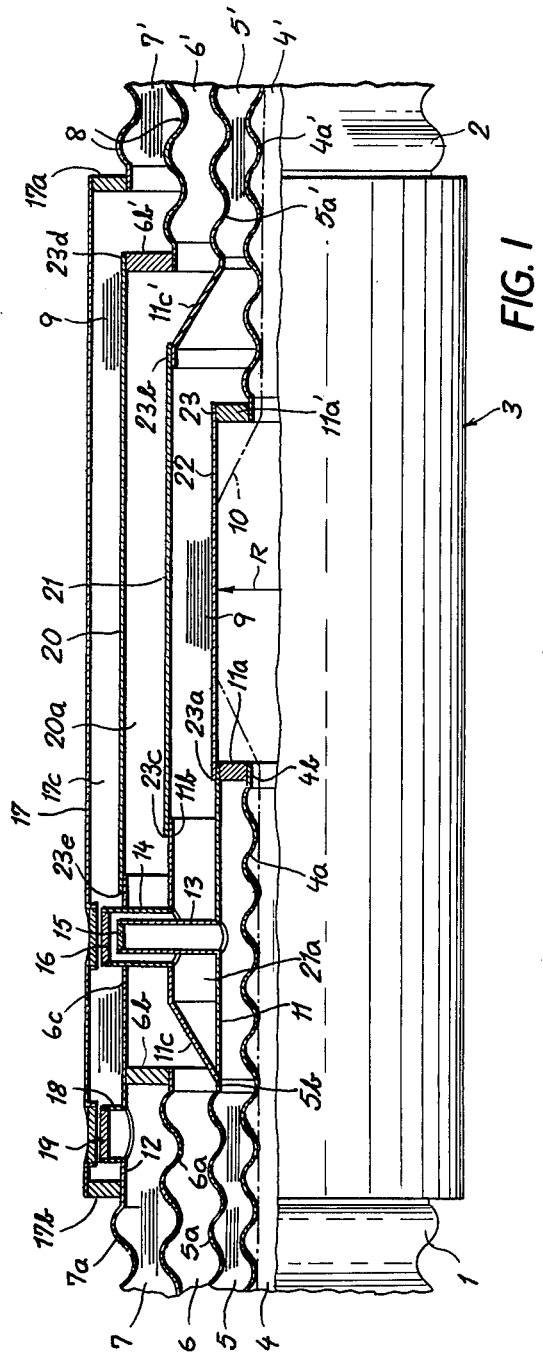
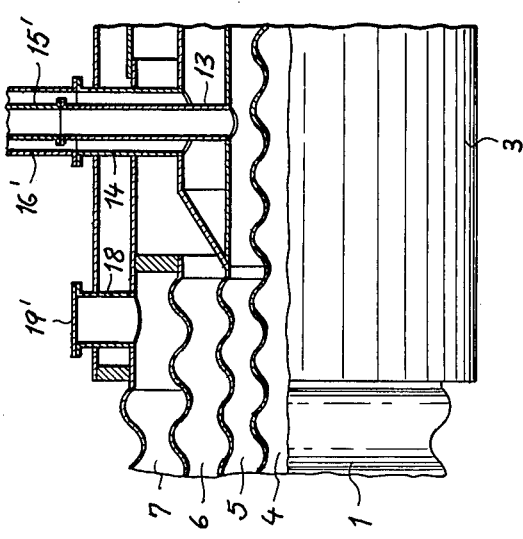
FIG. 1
FIG. 3

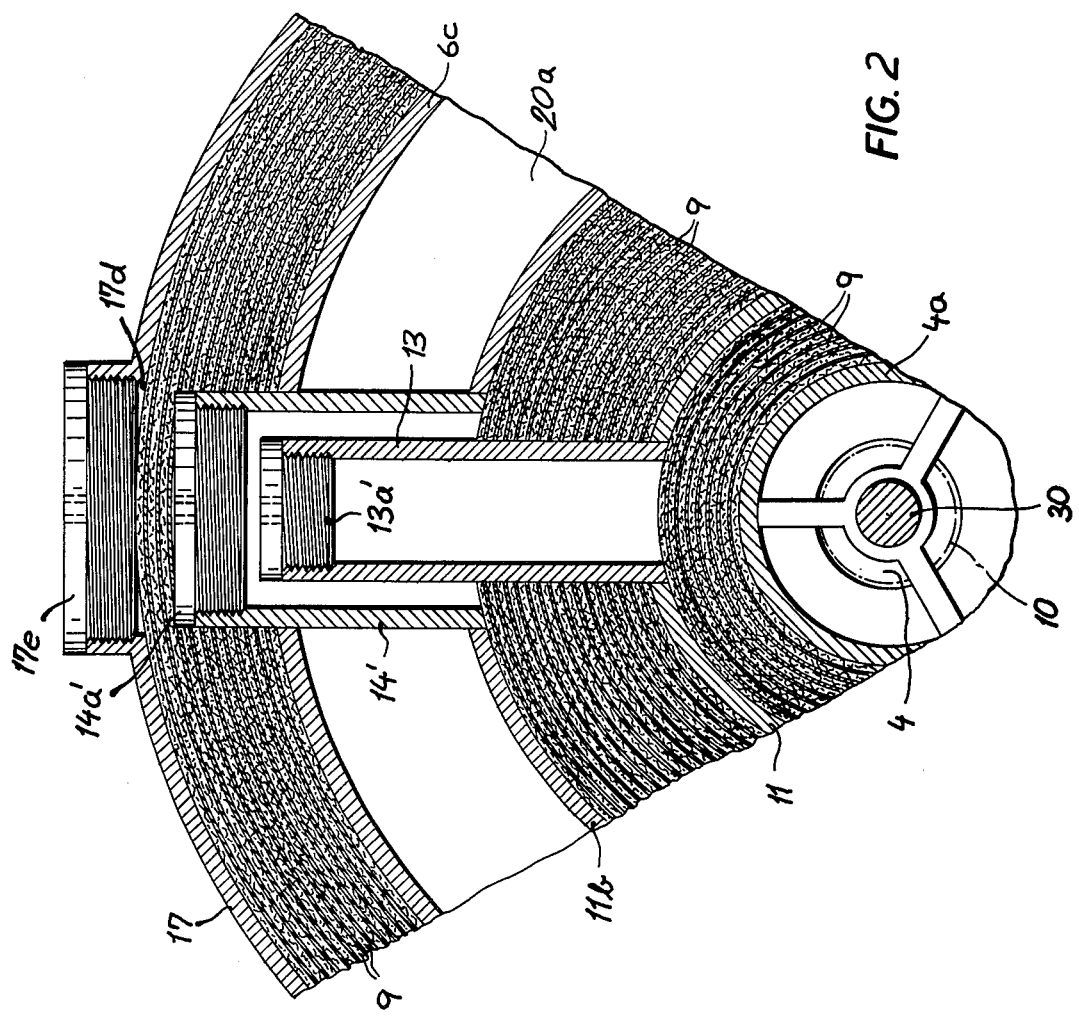

CABLE CONNECTION FOR LOW-TEMPERATURE CABLE

Field of the Invention

The present invention relates to the junction between a pair of low-temperature cable sections and, more particularly, to a connecting system for sections of low-temperature cables.

BACKGROUND OF THE INVENTION

A low-temperature cable system is an arrangement for conducting electrical current with low losses, utilizing if possible the phenomenon of superconductivity or the more general principle that the resistance of a conductor is reduced at very low temperatures. The very low temperatures which are most desirable are temperatures below the boiling point of helium and, therefore, liquid helium can be used as a coolant directly surrounding the electrical conductor.

To prevent the incursion of heat into the system or the "loss of cold" therefrom, the cryogenic or low-temperature cable must be shielded against the ambient temperature.

A typical low-temperature cable construction, therefore, comprises a plurality of generally coaxial ducts which may be elastically elongatable, e.g. corrugated, to allow for thermal expansion and contraction, the ducts defining between them a plurality of separate compartments.

The innermost compartment, which is traversed by the electrical conductor means, i.e. one or more electrical conductors in a common insulating sheath or in respective insulating sheaths, this central or innermost compartment being traversed by the lowest temperature coolant, preferably liquid helium.

U.S. Pat. No. 3,917,897 describes the delivery of helium coolant to such an inner compartment for a low-temperature cable. The coolant can be delivered to the low-temperature cable via a special terminal, e.g. as described in U.S. Pat. No. 3,885,636. The use of corrugated ducts to permit expansion and contraction is described in U.S. Pat. No. 3,861,022 and the insulating sheath can be of the type described in U.S. Pat. No. 3,781,455.

Directly outwardly of the inner duct, in which the insulating sheath and electrical conductor means are disposed, there can be an evacuated or vacuum compartment forming a shield against the incursion of heat or the loss of cold by conduction and convection. Radiation losses may be prevented by the filling of this evacuated compartment, or any of the evacuated compartments to be described hereinafter, with layers of superinsulation. A superinsulation, as this term is used in the art, is one which comprises a layer of porous thermal nonconductive material and a layer of radiation-reflective material. A multiplicity of such layers may be laminated together in alternating relationship (see the aforementioned patents).

The evacuated chamber can be surrounded by a coolant-filled chamber using a coolant at a temperature somewhat above the temperature of the liquid helium, e.g. liquefied nitrogen. Outwardly of this coolant-filled chamber there can be provided still another evacuated or vacuum chamber.

Because of the complexity of such low-temperature cables and the number of ducts from which they are constituted, the cables, for electrical current transmission over considerable distances, are formed in lengths or sections which must be interconnected at the installation site. The conventional method of connecting these cables has proved to be insufficiently reliable, lacking the satisfactory strength and incapable of protecting the low-temperature condition at the electrical conductor.

Furthermore, the amount of work required to make the connection and its cost is extensive. Conventional connection techniques are frequently not capable of providing a junction which can adequately withstand the thermal stresses to which the system is subject.

OBJECTS OF THE INVENTION

It is the principal object of the present invention, therefore, to provide an improved junction or connection for a low-temperature cable system in which the aforementioned disadvantages are obviated.

It is another object of the invention to provide a cable connection for low-temperature cable which can be fabricated economically, can be tested and used effectively, and which is capable of resisting the mechanical stresses arising because of variations in temperature.

Still another object of the invention is to provide a cable junction of a low-temperature cable of the character described of high mechanical and thermal stability, maximum insulating capacity and a high degree of vacuum-tightness.

A further object of the invention is to provide an especially low-cost and labor-saving connection for a pair of cable ends of the type described.

SUMMARY OF THE INVENTION

These objects and others which will become apparent hereinafter are attained, in accordance with the present invention, in a junction for a pair of cable ends having the above-described duct configuration in which the annular compartments of one of the cable ends, in the region of the junction, is radially outwardly offset and the vacuum chambers of this cable end overlap axially and radially the corresponding vacuum chambers of the other cable end, the overlapping parts of the vacuum chambers being separated from each other by rigid walls, preferably of cylindrical configuration, the rigid walls forming part of a rigid connection between the pipe ends of the other cable end from the interior to the exterior.

The rigid walls which define at least in part the overlapping vacuum chambers and which separate the overlapping vacuum chambers from one another, serve as heat resistors, i.e. impediments to heat transfer, between the central duct carrying the electrical conductors and cooled to the lowest temperature and the annular compartment filled with the coolant at the higher temperature, as well as between this latter chamber and the exterior.

The rigid walls are generally of cylindrical configuration although they can be of conical, frustoconical or other shape. The electrical conductor, or a plurality of electrical conductors, pass through the central compartment through which the low-temperperture coolant is caused to flow, the electrical conductor means being surrounded by an electrical insulation sheath, as described, for example, in U.S. Pat. No. 3,781,455.

In the region of the connection between the electrical conductors of the two cable ends, this insulation sheath may have an enlarged external diameter and hence a greater thickness to improve the insulation between the conductors and the proximal wall of the inner vacuum compartments.

To permit the increased thickness of the electrical insulation in the region of the actual conductor connection, the inner duct can be provided with a greater internal diameter in this region and can be formed by a furhter cylindrical rigid wall whose diameter is greater than the diameter of the inner duct over the remainder of the length of the cable.

The annular compartments of the first-mentioned cable end can be so arranged that they are of greater diameter in the region of the enlargement of the insulating sheath and the central passage for the purpose of axially overlapping the corresponding vacuum compartments of the other cable end.

It is important for the present invention that the aforementioned rigid walls separating the overlapping vacuum compartments form part of a rigid junction between the pipe ends of the other cable end, the rigid junction extending from the interior to the exterior.

This rigid connection increases substantially the stability of the cable system without affecting the necessary flexibility. Thermal stresses which arise in the cable connection can be taken up completely by the longitudinally elastic ducts while the rigid connection prevents the ducts from shifting axially relative to one another.

Both of the innermost vacuum compartments can be sealed from one another by a respective rigid wall in the region of overlap according to a feature of the invention. This has the advantage that a failure of the vacuum in one cable section is limited to that cable section and does not affect the vacuum in the other.

From the innermost vacuum chamber, there can extend radially a tube which can be surrounded by a tube from the overlapping vacuum chamber, these tubes extending into the outer vacuum chamber through the intervening coolant-filled chamber. This makes it possible to evacuate both inner vacuum chambers individually and to test the vacuum tightness of each chamber individually. Naturally, for this to be advantageous, the rigid wall between the overlapping vacuum chambers must completely seal one from the other.

The radially extending tubes are formed so that one of the tubes, generally the outer tube, forms part of the aforementioned connection and is rigidly joined to a pair of cylindrical walls traversed thereby. This is not however necessary since the rigid connection can also be provided by other supporting or guide elements between the duct ends. It is an advantage, however, when the number of heat bridging connections is to be minimized.

The outer tube preferably concentrically surrounds the inner tube and hence restricts heat incursion to the electrical conductor. There is thus no contact between the rigid wall of the inner-most vacuum chamber and the coolant surrounding the passage through which the radial tubes emerge.

While it has been found to be desirable that both of these radial tubes be individually closeable in a vacuum-tight manner, because these tubes can be individually or collectively evacuated, it should be noted that it might be desirable in some cases to make only the outer tube hermetically sealable while the inner tube remains permanently open within the outer tube.

The two tubes can terminate in the outer vacuum chamber or can pass through the wall thereof.

As suggested previously, the four vacuum chambers can be interconnected in conventional ways or can be separately or collectively connected through pressure-measuring devices, vacuum pumps or valves, e.g. as described in U.S. Pat. No. 3,885,635.

The cable connection according to the invention has the advantage that its assembly at the construction site is extremely sealable and convenient. The individual cable sections with the above-described elements can be fabricated in a factory and brought to the connection site. Assembly only requires that the electrical conductors and their insulating sheaths be connected together and the rigid cylindrical walls previously welded to one cable end be welded to the other cable end.

BRIEF DESCRIPTION OF THE DRAWING

The above and other objects, features and advantages will become more readily apparent from the following description, reference being made to the accompanying drawing in which:

FIG. 1 is a partial axial cross-sectional view illustrating an embodiment of the invention;

FIG. 2 is a transverse cross-sectional view through a portion of the system of FIG. 1; and FIG. 3 is a view similar to FIG. 1 illustrating a modification.

SPECIFIC DESCRIPTION

FIG. 1 shows, in diagrammatic form, a cable connection between two lengths 1 and 2 of low-temperature cable, a connection represented generally at 3. The cable 1 is formed with a central duct 4 defined by a corrugated duct 4a terminating at 4b axially ahead of the end 5b of a corrugated tube 5a which defines the annular chamber 5 between it and the duct 4a. Another corrugated duct 6a defines the annular chamber 6 with the duct 5a while the outer corrugated duct 7a defines the chamber 7 with duct 6a.

Chamber 4 is traversed by the low-temperature coolant, preferably liquid helium, and receives the electrical conductor or a plurality of electrical conductors as shown at 30 in FIG. 2. The conductor or conductors, hereinafter conductor means, is surrounded by a sheath of electrical insulation whose outline is shown at 10 in dot-dash lines. The sheath can correspond to that of U.S. Pat. No. 3,781,455.

This innermost chamber 4 is surrounded by the chamber 5 which is evacuated (see U.S. Pat. No. 3,885,636) and can be filled with superinsulation, e.g. as described in U.S. Pat. No. 3,917,897. Throughout the drawing, the insulation is represented at 9.

Chamber 6 is traversed by a higher temperature coolant, e.g. liquid nitrogen while chamber 7 is again evacuated and provided with a filling of superinsulation 9.

To accomodate the connection, a rigid wall 11 can be welded at 5b to the duct 5a and via a spacer 11a to the end 4b of the duct 4a. A frustoconical section 11c can also be welded at 5b to form part of a rigid wall 11b connectible to the cylindrical rigid wall 21 to be described hereinafter. A spacer 6b bridges the ducts 6a and 7a and is welded to a rigid wall 6c. Corresponding spacers 6b and 11a are provided at 11a' and 6b' for the ducts of the other cable end 1 and a frustoconical wall 11a' is likewise formed on the duct 5a' of this cable end. The cable end 2 has a helium traverse chamber 4', an evacuated chamber 5', a nitrogen traversed chamber 6' and an evacuated chamber 7' as previously described.

All of the ducts described above are corrugated as shown at 8 and hence longitudinally elastic to accommodate thermal expansion and contraction.

A rigid cylindrical wall 22 is welded at 23 to the spacer 11a', e.g. at the assembly site and has a greater internal radius R than the ducts 4a and 4a' through which the electrical conductor passes. This allows the sheath of electrical insulation 10 to be of increased diameter in this region. The rigid wall 22 is welded at 23a to the right 11a to interconnect the inner chambers of the two cable ends and allow free flow of the primary coolant, liquid helium, therethrough. A further rigid wall 21 is welded at 23b to the wall 11c' and at 23c to the wall section 11b. Thus the rigid walls 21 and 22 define a compartment 21a which extends the chamber 5' (the inner vacuum chamber of cable end 2) over the corresponding inner vacuum chamber 5 of cable end 1.

Another cylinder rigid wall 20 is welded at 23d to the spacer ring 6b' and at 23e to the wall section 6c, thereby defining a flow passage 20a which interconnects the coolant-traversed chamber 6 and 6'.

The outermost rigid wall 17 is welded to the spacer rings 17a and 17b to form an extension 17c of the compartment 7' overlapping the compartment 7. The spacer 17a, 17b, 6b, 6b', etc. form a rigid assembly of the rigid cylindrical walls with the corrugated ducts of the cable ends.

A first tube 13 extends radially outwardly from the innermost vacuum chamber 5 and is surrounded by a second tube 14 reaching outwardly from the innermost vacuum chamber 5a' of the other cable end. These tubes may be sealed hermetically as represented at 15, 16 so that they can be separated or collectively accessible. The tubes end in the furthest outwardly disposed vacuum chamber.

In the modification of FIG. 3, the tubes 13 and 14 project outwardly beyond the rigid wall 17 and can be connected to individual pipes 15' and 16' for drawing the respective vacuums. A similar pipe 18 can pass through the wall 17 from the vacuum chamber 7 and can be closed hermetically with a cap 19'. In the embodiment of FIG. 1, however, the cap 19 is provided on the pipe 18 within the outer vacuum chamber 17c.

FIG. 2 shows that the wall 17 can be formed with an opening d in which a plug 17e is fitted to hermetically seal the chamber 17c. When the plug 17e is removed, access may be has to the plugs 14a' and 13a' of the tubes 13' and 14' corresponding to the tubes 13 and 14. The plugs 14a' and 13a' correspond to the hermetic seals represented at 15 and 16 in FIG. 1.

I claim:

1. A cable junction comprising a first cable end and a second cable end, each of said cable ends comprising a first duct defining a central compartment and an electrical conductor and traversed by a first coolant, a second duct around said first duct and defining therewith an inner vacuum compartment, a third duct surrounding said second duct and defining therewith another coolant-traversed compartment, and a fourth duct surrounding said third duct and defining therewith an outer vacuum compartment; the compartments of one of said cable ends being offset radially outwardly in relation to the compartments of the other of said cable ends, the vacuum compartments of said one cable end axially overlapping the corresponding vacuum compartments of said other cable end, rigid wall means separatng the overlapping vacuum compartments from each other and said rigid wall means forming part of a rigid connection of said ducts of said other cable end from the interior to the exterior.

2. The cable junction defined in claim 1 wherein said rigid wall means comprises first and second rigid cylindrical walls respectively connected to said second and fourth ducts of the other of said cable ends.

3. The cable junction defined in claim 2 wherein said first rigid wall separates the two overlapping inner vacuum compartments in a vacuum-tight manner.

4. The cable junction defined in claim 3, further comprising a first radially outwardly extending tube communicating with the inner vacuum compartment of said other of said ends and a second radially extending tube communicating with the inner vacuum compartment of said one end, said tubes extending outwardly at least into the outer vacuum compartments of said one of said ends.

5. The cable junction defined in claim 4 wherein at least one of said tubes forms a rigid connection between two of said walls.

6. The cable junction defined in claim 4 wherein said second tube coaxially surrounds said first tube.

7. The cable junction defined in claim 4, further comprising means for individually hermetically sealing said tubes.

8. The cable junction defined in claim 2 wherein said second wall separates said outer vacuum compartments from one another in a vacuum tight manner.

9. The cable junction defined in claim 8, further comprising a radially extending tube communicating with the outer vacuum compartment of said other end and reaching into the outer vacuum compartments of said one of said ends.

10. The cable junction defined in claim 9, further comprising means for hermetically closing said tubes.

* * * * *